(12) United States Patent
Lin et al.

(10) Patent No.: US 11,687,694 B1
(45) Date of Patent: Jun. 27, 2023

(54) METHOD, PRODUCT, AND SYSTEM FOR AUTOMATED, GUIDED, AND REGION-BASED LAYER DENSITY BALANCING

(71) Applicant: Cadence Design Systems, Inc., San Jose, CA (US)

(72) Inventors: Yu-Chen Lin, Taipei (TW); Yi-Ning Chang, Taipei (TW); Tyler James Lockman, Wesley Chapel, FL (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/219,675

(22) Filed: Mar. 31, 2021

(51) Int. Cl.
*G06F 30/392* (2020.01)
*G06F 30/398* (2020.01)

(52) U.S. Cl.
CPC .......... *G06F 30/392* (2020.01); *G06F 30/398* (2020.01)

(58) Field of Classification Search
CPC ...... G06F 18/2178; G06F 18/25; G06F 17/18; G06F 16/2477; G06F 18/217; G06F 18/00; G06F 18/21; G06F 2211/005; G06F 2218/00; G06F 18/40; G06F 16/245; G06F 16/2379; G06F 16/24; G06F 16/29; G06F 16/58; G06F 16/5838; G06F 16/9535; G06F 16/9537; G06F 16/9554; G06F 3/0482; G06F 9/5072; G06F 16/50; G06F 16/5866; G06F 3/04842; G06F 16/1824; G06F 16/21; G06F 16/2465; G06F 18/2323; G06F 3/0219; G06F 3/0233; G06F 3/0237; G06F 3/0238; G06F 40/30; G06F 9/3455; G06F 9/3897; G06F 1/163; G06F 11/2094; G06F 12/0215; G06F 12/0246; G06F 12/0638; G06F 12/0862; G06F 12/0866; G06F 12/12; G06F 12/1408; G06F 13/4018; G06F 13/4027; G06F 15/7814; G06F 15/7867; G06F 16/254; G06F 16/258; G06F 18/24133; G06F 21/57; G06F 21/608; G06F 21/72; G06F 21/73; G06F 21/85; G06F 2212/205; G06F 2212/654; G06F 2212/7203; G06F 3/013; G06F 3/0613; G06F 3/065; G06F 3/0659; G06F 3/0679; G06F 40/166; G06F 40/20; G06F 40/247; G06F 40/40; G06F 9/30047; G06F 9/30076; G06F 9/30181; G06F 9/3802;
(Continued)

(56) References Cited

U.S. PATENT DOCUMENTS

| | | | |
|---|---|---|---|
| 8,413,093 B1* | 4/2013 | Rao | G06F 30/3312 716/110 |
| 2015/0370945 A1* | 12/2015 | Lee | G06F 30/392 716/55 |
| 2018/0365370 A1* | 12/2018 | Egan | G06F 3/04847 |

* cited by examiner

Primary Examiner — Binh C Tat
(74) Attorney, Agent, or Firm — Vista IP Law Group, LLP

(57) ABSTRACT

An approach is disclosed herein for balancing layer densities in using an automated process. The approach disclosed herein operates on a region-by-region and layer-by-layer basis to perform parameterized layer balancing. In some embodiments, the process comprises determining densities of respective layers in respective regions, evaluating each layer and region to determine whether operations need to be taken to balance those layers in the corresponding regions, determining what those actions should be, and then implementing those actions. Additionally, in some embodiments, the process may operate in different orders and may be (Continued)

associated with a looping flow until a layout being processed has been balanced.

20 Claims, 15 Drawing Sheets

(58) Field of Classification Search
CPC ...... G06F 9/383; G06F 9/3851; G06F 9/3877; G06F 9/451; G06F 9/453
USPC .................................................. 716/100–108
See application file for complete search history.

METHOD, PRODUCT, AND SYSTEM FOR AUTOMATED, GUIDED, AND REGION-BASED LAYER DENSITY BALANCING

FIELD

The present invention is directed to approaches for balancing layer density across integrated circuits.

BACKGROUND

Integrated circuits are constructed from multiple layers of metal and other materials that are placed on a substrate. For example, power and ground is distributed to different circuit elements using multiple different metal layers, vias, routing paths, and planes. Capacitors and transistors are created from various combinations of conducting, semiconducting, and insulating layers. The process of placing these elements (e.g., via deposition) creates these layers one on top of the other. However, while the substrate starts out as a relatively flat surface, each placement of material adds thickness to the substrate which is not necessarily evenly distributed. Additionally, the uneven distribution can be reinforced by each layer. As a result, the surface of the semiconductor substrate can become less planar and more like a series of hills and valleys.

The problem with an uneven surface is twofold. First, the variation can change the overall length and shape of elements that are being deposited on previous layers which can affect signal path lengths and behavior and increase manufacturing difficulty/reliability. Second, an increased in density of elements within one region of the integrated circuit with respect to another can be reflected in an uneven surface which may be difficult to cool properly, package, and/or interconnect.

Current solutions to this issue rely on engineers to manually determine how objects should be placed across different regions of a design to more consistently build up each layer. However, such techniques use a trial-and-error approach that is based on an engineer's intuition as opposed to being process based. In addition, the results from different engineers can vary according to the skills of the engineer. As a result, such processes are time consuming. Furthermore, simply inserting a planar object that fills any available space on a respective layer also does not solve the balancing problem because that planer layer can result in too much of the layer being covered. However, placement of a planar fill object can be one technique that is used to increase the overall coverage of a particular layer in combination with degassing (placing holes in a layer) where appropriate to bring the amount of area covered by the corresponding layer material within a consistent target range. However, degassing techniques suffer the same drawbacks as current fill techniques.

Thus, what is needed is an improved method, product, and system that avoids the issues associated with current techniques.

SUMMARY

Embodiments of the present invention provide an approach for a method, product, and system for automated, guided, and region-based metal balancing.

Disclosed herein is a new approach to balancing layer densities that uses an automated process. The approach disclosed herein operates on a region-by-region and layer-by-layer basis to perform parameterized layer balancing. In some embodiments, the process comprises determining densities of respective layers in respective regions, evaluating each layer and region to determine whether operations need to be taken to balance those layers in the corresponding regions, determining what those actions should be, and then implementing those actions. Additionally, in some embodiments, the process may operate in different orders and may be associated with a looping flow until a layout being processed has been sufficiently balanced.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

DETAILED DESCRIPTION

Embodiments of the present invention provide an approach for a method, product, and system for automated, guided, and region-based metal balancing.

Various embodiments are described hereinafter with reference to the figures. It should be noted that the figures are not necessarily drawn to scale. It should also be noted that the figures are only intended to facilitate the description of the embodiments and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated.

Generally, an integrated circuit is designed for manufacture on a process node. That process node will be associated with various rules (design rules or DRC) that are to be complied with to account for the inherent limitations of the process. For example, rules governing spacing between elements that are not supposed to be connected to each other, rules regarding via placement and density, etc. Particularly relevant to the approach disclosed herein, the rules will generally specify region-based density rules for certain layers of an integrated circuit to be constructed (e.g., metal layers though the approach herein could be used to balance other layer having different materials). For example, the process node might define a region to be used in layer balancing, a minimum density, a maximum density, and a maximum density delta between neighboring regions. The approach disclosed herein provides an improved approach to meet region-based density rules. To achieve the density modifications the layers can be filled or degassed. As used here, "fill" refers to adding new objects in a corresponding layer that are to be manufactured from the layer material, whereas "degas" refers adding holes in the corresponding layer that exclude the creation of the layer material within the holes during manufacture.

Figure 1:
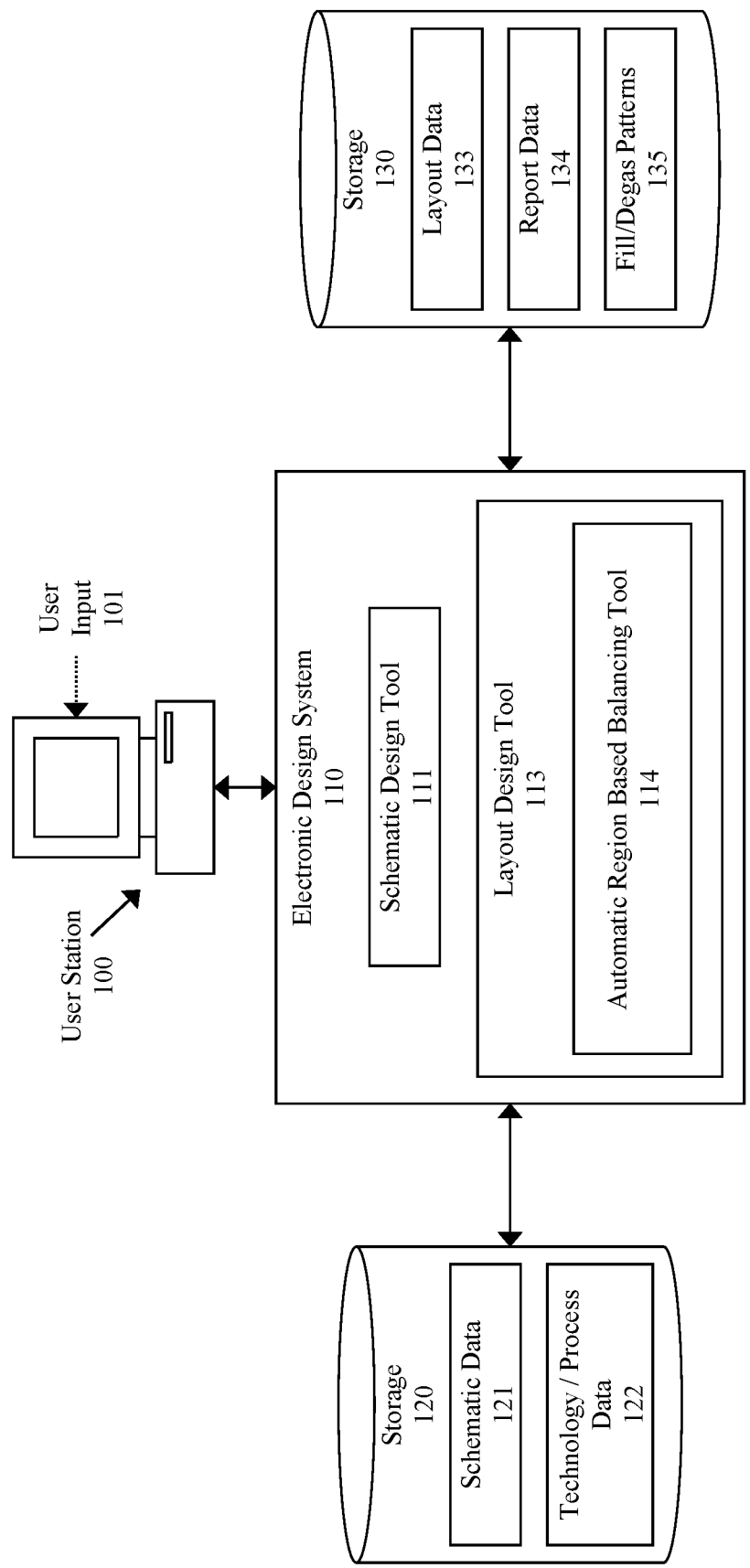
FIG. 1 illustrates an example arrangement having the automated region based balancing tool according to some embodiments.

FIG. 1 illustrates an example arrangement having the automated region based balancing tool according to some embodiments. Generally, the process operates on a layout to add or remove material dispersed across regions of a semiconductor substrate in respective layers.

As illustrated, FIG. 1 includes a user station 100, storage 120 and 130, and electronic design system 110. Each are discussed in turn below.

In some embodiments, the user station 100 includes or provides access to the electronic design system 110 and controls the process of metal layer balancing, according to a set of rules and process parameters for a selected layout. For instance, the electronic design system 110 might be located on the user station 100, on a remote device accessed by the user station, or distributed across multiple devices. The user station 100 causes the execution of a process to balance the layers. The user station 100 comprises any type of computing station that is useable to operate or interface with a database (e.g., 120 and/or 130). Examples of such user stations include workstations, personal computers, or remote computing terminals. In some embodiments, the user station 100 comprises a display device, such as a display monitor, for displaying a user interface to any users at the user station. The user station 100 also comprises one or more input devices for the user to provide operational control over the user station, such as a mouse or keyboard to manipulate a pointing object in a graphical user interface from which a user input 101 might be received.

The electronic design system 110, as illustrated, includes a schematic design tool 111 and a layout design tool 113. In some embodiments, the layout design tool 113, might be provided separately from an automated region based balancing tool (see 114), and the automated region based balancing tool (ARBB) might operate on a layout to generate a balanced design using at least layout data 133 discussed herein. In some embodiments, the various components, or the functions, of the electronic design system 110 are combined or separated into different components from those illustrated. In some embodiments, the electronic design system is implemented within a cloud computing platform and may utilize one or more resources of the cloud. In some embodiments, the cloud computing system is provided by a third party to a user, where the user uses a user station (e.g., user station 100) to connect to the cloud computing system and to control the operations of the electronic design system. In some embodiments, only a portion of the electronic design system is provided on the cloud system, such as the schematic design tool 111, the layout design tool 113, and/or the ARBB for balancing based on user/process defined region(s) 114. In some embodiments, any combination of storage 120 and/or 130, or portions thereof, are provided by, or connected to, the cloud computing system.

The schematic design tool 111 comprises a tool for creating and/or modifying a schematic of a circuit design. For instance, schematic design tools are generally known in the art and comprise different components for different types of design activities. For instance, one circuit design component might comprise an interface for accepting a hardware description or portion thereof as described by a hardware design language (e.g., Verilog, VHDL, etc.). Another circuit design component might comprise a circuit design component for manually manipulating/creating a circuit design using a circuit schematic. Generally, the schematic design tool 111 operates on schematic data (e.g., schematic data 121 stored in database 120) and can be used to generate a circuit schematic used in semiconductor/electronics manufacturing. In some embodiments, the schematic design tool can represent/synthesize a netlist for a circuit schematic to be converted into an integrated circuit layout balanced using the process as disclosed herein which may be contained/integrated within a layout design tool such as layout design tool 113.

The layout design tool 113, comprises a tool for creating and/or modifying a layout of a circuit design. For instance, layout design tools comprise different components for different types of design activities that provide a representation of a physical form of a netlist. For instance, a layout design component might comprise a layout editor for modifying/creating layers of a design as they would be constructed on a semiconductor substrate or printed circuit board. Generally, the layout design tool 113 operates on layout data (e.g., layout data 133 stored in database 130 and using information associated with a technology/process as embodied in technology/process data 122 in database 120) and can be used to generate a circuit layout used in semiconductor/electronics manufacturing that corresponds to a netlist commonly generated using a schematic design tool (e.g., 111). In some embodiments, the layout design tool 113 and/or the electronic design system 110 is modified to include an automatic region based balancing tool (ARBB) for balancing a design 114. The operation of the ARBB tool 114 will be described further below. Briefly, the process uses various patterns to fill or degas a design to distribute material more evenly in respective layers on a layer-by-layer and region-by-region basis.

The system includes a database 120 which as illustrated includes schematic data 121 and technology/process data 122, and database 130 which as illustrated includes layout data 133, reporting data 134, and fill/degas patterns 135. In some embodiments, the database 120 and 130 comprises a single database with one or more subsets within the database for the different types of data as illustrated in FIG. 1. However, in some embodiments the database comprises multiple separate databases on different computing systems and/or in different locations connected via electronic communication links (e.g., wired and/or wireless networks). The system may further include a database access module(s) for accessing and storing relevant data, whether stored at a single database or at multiple databases.

The schematic data 121 comprises any type of representations of a schematic of a circuit design. For instance, the design data comprises any one or more of a hardware descriptive language design, a circuit schematic design, netlist, or any combination thereof. The layout data 133 comprises any types of representations of a physical form of a circuit design. For instance, the layout data comprises a circuit layout consisting of a plurality of shapes on a plurality of layers.

The technology/process data 122 comprises any relevant process parameters for a target node of a given design. Generally, the technology/process data 122 is used by the layout design tool 113 and the ARBB tool 114 to generate a physical design that is compliant with the relevant technology/process data 122. For example, the report data 134 might indicate whether a layout is balanced, which regions have balance violations, the types of balance violation, and the corresponding density of each region and layer therein as determined based on at least the corresponding rules indicated in, or by, the technology/process data 122. The technology/process data 122 might specify any combination of a minimum density, a maximum density, a maximum density delta (different) between regions, or any combination thereof with each parameter represented by a percentage or equivalent value.

The fill/degas patterns 135 might comprise various patterns that can be used to fill or degas a design. Each such pattern may be constructed from any number of objects that can be repeated in a specified order. Furthermore, each pattern may be associate with an overall, and a per object fill/degas rate. For instance, a pattern might comprise a rectangular shape having a width and length that is to be placed as if in an array along rows and columns. Those patterns might also be associated with respective fill/degas rates. For example, a fill pattern might provide a 50% fill rate in that the pattern will increase the density of an area by 50% presuming all objects can be placed in the designated region. Likewise, a degas pattern might comprise a mirror of the fill pattern, such that it can be used to create holes in a plane instead of objects, with the holes to be placed as if in an array along rows and columns.

Figure 2:
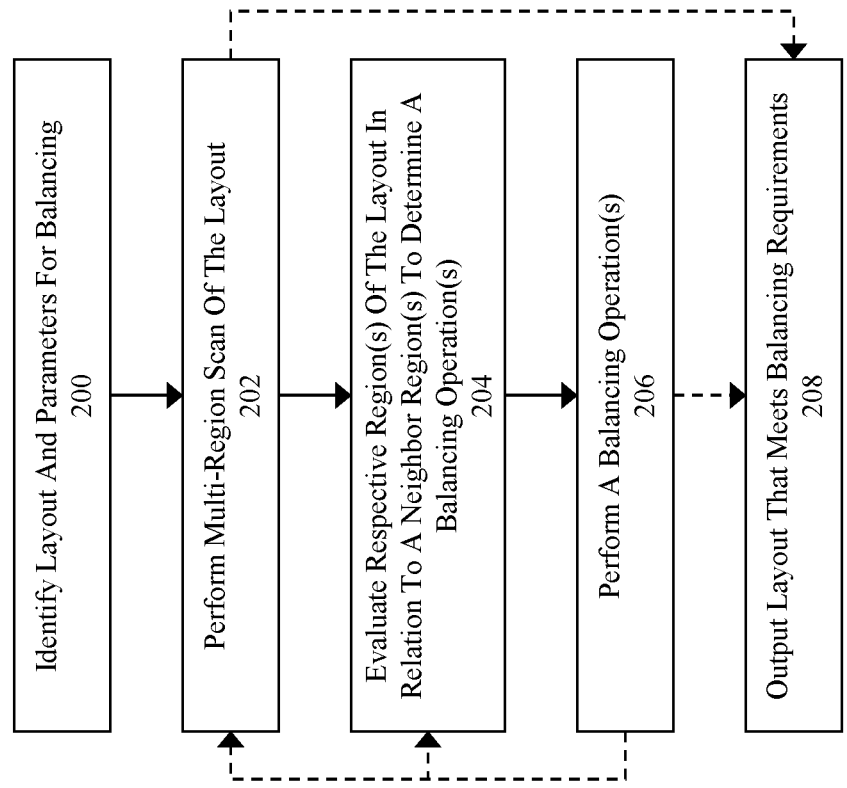
FIG. 2 illustrates a flow for automated region-based balancing according to some embodiments.

FIG. 2 illustrates a flow for automated region-based balancing according to some embodiments. Generally, the processes will scan a design to determine current density on a region-by-region and layer-by-layer basis, evaluate each region and layer combination to determine appropriate balancing actions to take, and then perform the determined actions to balance a design. In some embodiments the process is recursively executed at/over any number of stages.

The process starts at 200, where layout and balancing parameters are identified. The process might be triggered by a user on an as needed basis or the process may be triggered by another process (e.g., a final validation process) to ensure that a design is properly balanced before manufacturing. The parameters for balancing might comprise a minimum density, a maximum density, and a maximum density delta between neighboring regions. In some embodiments, the maximum density delta allowed between regions depends on the particular spatial relationship of a selected region and a neighboring region (e.g., a horizontally adjacent region might be associated with one maximum density delta, a vertically adjacent region might be associated with another maximum density delta, and a diagonally adjacent region might be associated with yet another maximum density delta). In addition, the process might retrieve one or more spacing rules for use in placing objects according to a pattern but where such objects are not placed or are removed when they violate a corresponding rule.

After a layout is identified, the process continues at 202 where multiple regions of the layout are scanned to determine the density of each layer within the region. In some embodiments, an initial process is executed to scan the entire layout on a region-by-region and layer-by-layer basis and a corresponding data structure is generated to capture per region and layer densities. In some embodiments, a first region is scanned along with any neighbor regions that are relevant to a determination of whether a particular region is balanced. Generally, the process determines the percentage or total area within a region that is covered, or not covered, by the current layer. One possible approach to implementing the scanning is discussed in regard to FIG. 3.

At 204 one or more regions and layers are selected and evaluated to determine what, if any, balancing operations should be performed. This process will be discussed further in regard to an embodiment discussed in FIG. 4 below. Generally, this process operates by determining whether a layer within any given region is outside of the specified ranges (e.g., below the minimum density, above the maximum density, or has a delta in relation to a neighboring region that is beyond a maximum). If the layer with the region is not within the required range the process will then evaluate one or more patterns to determine which pattern or patterns might most appropriately be applied (e.g., based on corresponding pattern fill/degas rates). In some embodiments, one or more patterns may be selected for partial fill.

At 206, any balancing operations identified in 204 are attempted. For example, a first pattern might be used to perform a fill or degas operation using the full pattern (as in without intentionally skipping any objects in the pattern), and a second pattern might be used to perform a partial fill (where at least one object is not created). Approaches to this process will be discussed further below in regard to at least FIG. 5. In some embodiments, the placement of objects/holes within respective patterns is tracked for use in determining the success of those placements which allows for calculation of the actual results of the placement. The calculation can then be used to trigger a rescan of one or more regions or reevaluation thereof (possibly in response to exceeding a threshold).

If the balancing operations were successful, the process will continue to 202 to perform a rescan of the layout, to 204 to determine more balancing operations, or possible to 208 if the design has been sufficiently balanced. If the design is balanced the process might output the design or update the existing design according to the placements of objects and holes and generate a report indicating that the layout has been balanced and possibly indicating the densities for respective region and layer combinations, and/or deltas between region and layer combinations.

Figure 3:
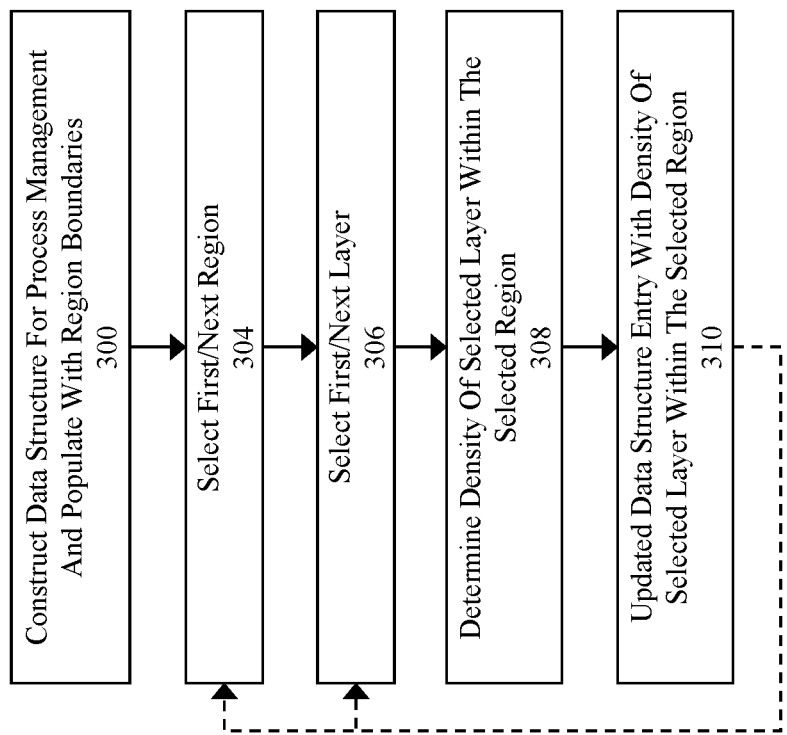
FIG. 3 illustrates an example flow for performing a multi-region scan of the layout from FIG. 2 according to some embodiments.

FIG. 3 illustrates an example flow for performing a multi-region scan of the layout from FIG. 2 according to some embodiments. Generally, the approach illustrated here operates on a region-by-region basis, with each layer within a region being scanned before another region and its layers are then scanned. Additionally, the process generates density data that can be used to determine whether a layout is balanced and if not in what way the layout should be modified (fill or degas), and to what extent (e.g., target percentage increase/decrease). However, other orders of selecting could be executed from those illustrated here, such as selecting a layer and then processing that layer for all regions.

As illustrated, the process starts at 300 where a data structure is generated for process management. For example, a set of structured data (e.g., XML, a table, a list, a linked list, a construct within a database, or any other data structure) is generated to maintain density values and other relevant information at least during the balancing process. For example, a table could be generated that comprises a set of entries with an entry location for each unique layer and region combination within the layout, and another for coordinates defining each region. Additionally, the data structure can be updated to reflect the region boundaries. Normally, the size of a region will be defined by the process. Thus, in a simpler case, the layout area can be divided into the appropriate number of non-overlapping regions. In some embodiments, to improve the accuracy/resolution of the balancing operations, the regions may be defined to be overlapping. For example, regions that overlap with 50% of another region either horizontally, vertically, or both. In such embodiments, as will be discussed below, the applicable patterns are normally only applied to any newly encompassed area within a region.

At 304 a first region is selected. Any relevant a reproduceable order of selection could be employed here. For example, regions could be selected horizontally starting with a region closest to an origin, where all the regions within the same row being selected before moving vertically to select an adjacent unprocessed row. Likewise, regions could be selected vertically, and then horizontally (e.g., by column and row). Regardless, of the specific order, the process will first select a first region at an extremum (e.g., one of the corners of the layout). Subsequent selections will then select an adjacent unprocessed region proceeding first horizontally or vertically and then vertically or horizontally. Subsequently, a first or next layer will be selected at 306. Generally, the layers can be selected in any order in this flow. However, a highest or lowest layer will normally be selected first followed by subsequent layers or nearest layers having the same type of material (e.g., metal).

At 308 the layer is scanned within the selected region. Generally, this process analyzes the area of the layer defined by the region to determine the density of the relevant material. For, example, determining the total area of the region, determining the total area to be covered within said region by the relevant material, and using that information to compute a density as represented by a percentage of the total area within the region or an equivalent set of operations or any other operations that together provide the same result. Once the density is calculated, the data structure is updated to reflect that value. For example, an entry in a corresponding column for the layer and row for the region is populated with the density for that layer within that region (see 310). The process then continues at 304 and or 306 as needed.

Figure 4:
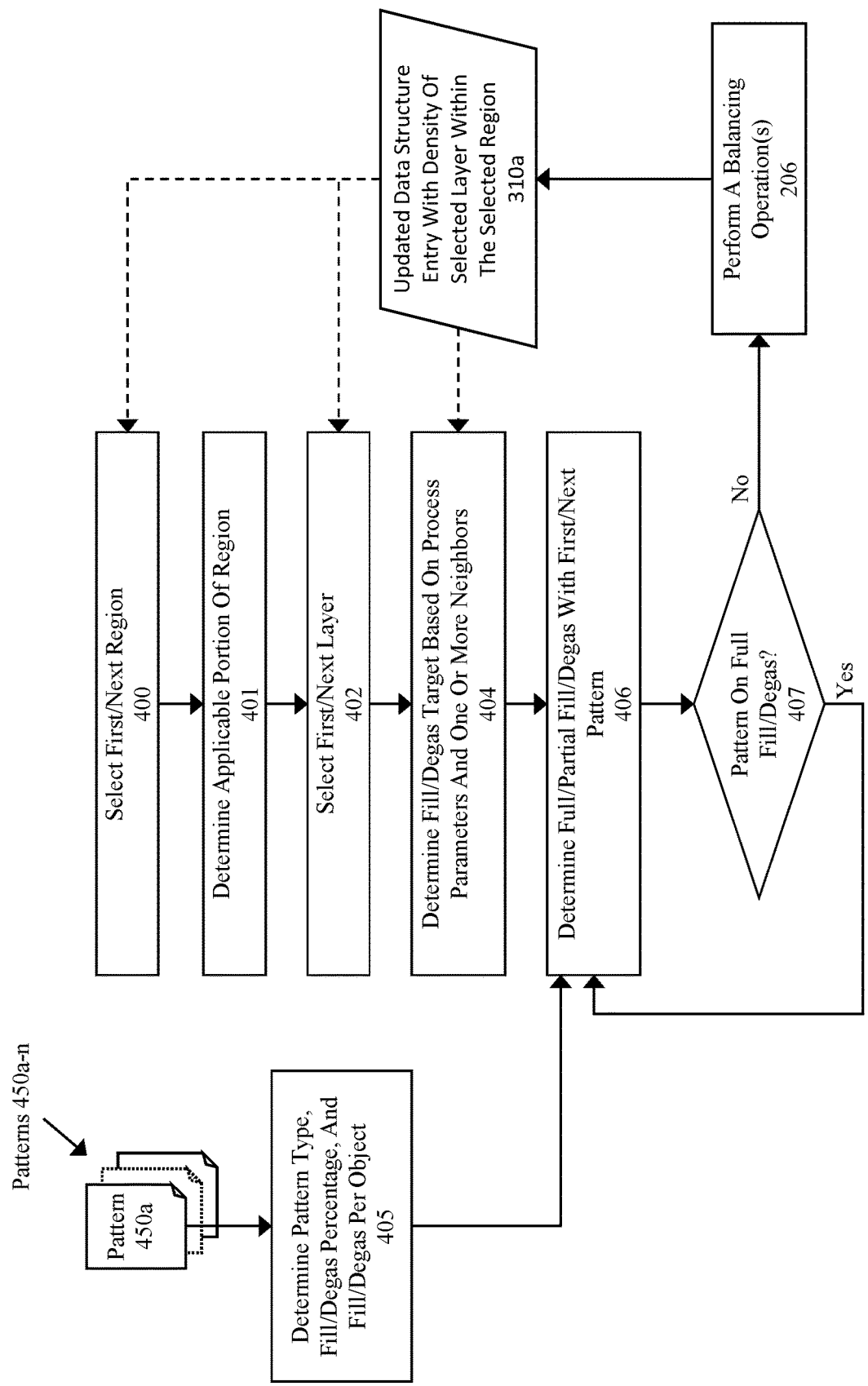
FIG. 4 illustrates an example flow for evaluating respective region(s) of a layout in relation to a neighbor region(s) to determine a balancing operation(s) from FIG. 2 according to some embodiments.

FIG. 4 illustrates an example flow for evaluating respective region(s) of a layout in relation to a neighbor region(s) to determine a balancing operation(s) from FIG. 2 according to some embodiments. The flow can be largely similar or even the same as that from FIG. 3 as far as selection of regions and layers is concerned. However, the operations within the flow will differ and largely comprise evaluation operations to determine a desired effect and a plan to achieve that desired effect.

The process starts at 400 where a first or next region is selected. The selection may be ordered in any of the ways discussed herein. Once a given region is selected a determination of an applicable portion can be made. If regions are defined such that they do not overlap, the relevant portion will comprise the entire region. Thus, to the extent the regions are non-overlapping this step may be omitted. However, if regions are defined such that they overlap then this step can determine which portions are to be operated on. This might comprise a selection of a portion of a region that was not operated on or selected for a preceding region. In this way, balancing operations will not modify areas that were likely already balanced. This will be discussed further below in regard to at least FIG. 6. Once the relevant portion of the region is determined a first or next layer is selected according to any of the approaches discussed herein (see 402).

At 404 a fill or degas target is determined based on process parameters. In some embodiments, at least one of the process parameters depend on a density for a neighboring region(s). For example, the process parameters might comprise a minimum density, a maximum density, and a maximum density delta between neighboring regions. Additionally, one or more rules might be used to determine how to select a target density. For example, a rule might specify that the average of the minimum and maximum densities is the target density, the maximum density when fill is required, the minimum density when degas is required, a value equal to the density of a neighbor region for the corresponding layer, a value based on multiple neighboring regions for the corresponding layer, or some combination thereof. The values of each region can be retrieved from 310a which is the data generated at 310. In some embodiments, the evaluation process can be used to trigger the scanning of the relevant regions and generation of the data structure as necessary as discussed in FIG. 3.

At 406 one or more patterns and the fill/degas levels to be used are determined based on pattern data. As a precursor to this process, one or more patterns (e.g., patterns 450a-n) might be analyzed to determine their type (fill or degas), their overall percentage (of fill or degas), and their per object (fill or degas) rate (see 405) under a given set of conditions. Patterns comprise one or more instances of one or more objects. Each of which will fill/degas a certain area. Using this information and the target or change in percentage fill determined at 404, the process will select a first pattern and having the correct type (fill or degas), including whether that pattern should be fully or partially utilized. For example, if a target is a 25% increase in density then the process might first select a pattern with a 20% fill rate at full, and then after 407 a second pattern with a fill rate of 10% using a partial fill/degas process at 50% (e.g., skipping every other object/hole).

According to one embodiment, once a partial or full fill/degas pattern is specified the process proceeds to 206 to perform a balancing operation before triggering an update to the data structure 310a. However, in some embodiments, the process may evaluate multiple layers and or regions before performing balancing operations in batches for multiple layers and/or regions.

Figure 5:
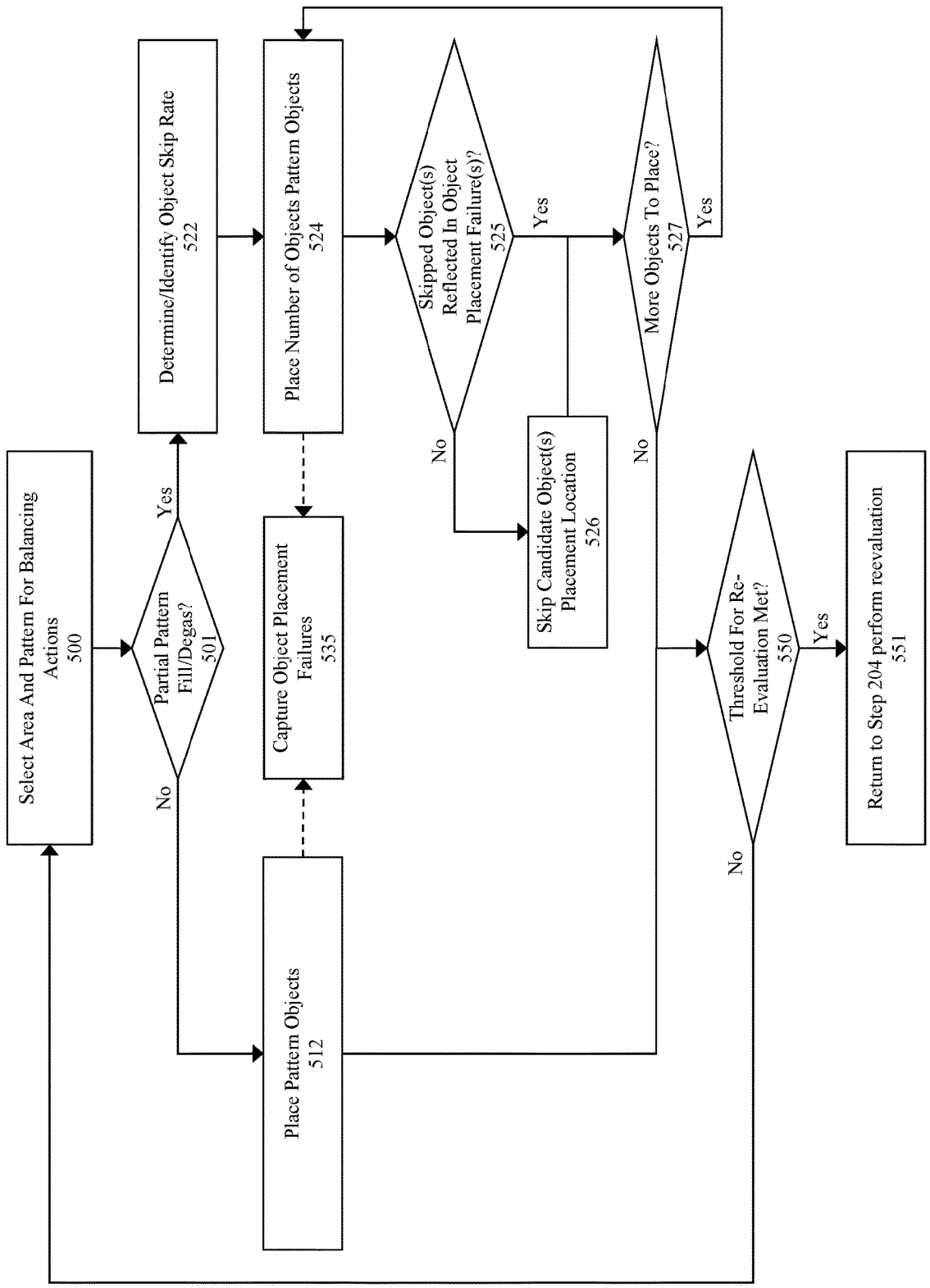
FIG. 5 illustrates an example flow performing a balancing operation(s) from FIG. 2 according to some embodiments.

FIG. 5 illustrates an example flow performing a balancing operation(s) from FIG. 2 according to some embodiments. Generally, the process operates by attempting to place objects/holes as specified by the evaluation process. In some embodiments, the attempt is full placement of every object within a pattern for a given region and layer combination. The process here is illustrated with regard to a region and layer combination but does not disclose the selection or identification thereof.

In some embodiments, the process starts at 500 where a pattern and an area to place the objects of the pattern is determined. In the case of non-overlapping regions, an area that encompasses the entire region is selected. If the regions are overlapping a relevant portion is selected (generally a portion that was not processed already in the same pass).

At 501 an identification is made as to whether the pattern fill/degas is to use full or partial creation. If the pattern fill/degas is full creation, then at 512 the process attempts to place each object instance of the pattern at every corresponding location across the identified area. In the even that an instance of an object/hole cannot be placed at any particular location specified according to the pattern, that information can be captured at 535, such as by identifying the layer, pattern, and object that could not be placed. If multiple such objects cannot be placed, then a number may be used to specify how many instances could not be placed. In some embodiments, the total number of objects/holes to be or actually placed is also captured.

The total number of object placement failures and successes may be used at 550 to determine whether a threshold has been met to trigger reevaluation of the region. Often, patterns are likely to have one or more objects/holes that conflict with another portion of the layout. If this happens, the total effect of the pattern will be less than the ideal estimate used in the evaluation and planning for the use of those patterns. In some embodiments, a machine learning process is utilized to track and then predict the overall effect likely to occur when a pattern is specified and applied. For example, a machine learning model could utilize the process parameters discussed herein, along with layer information (e.g., current coverage level) and feature sizes for respective layers to learn and then predict the actual effect. In some embodiments, this machine learning model is used to predict the actual effect to decrease a number of processing passes required for respective regions and layers by incorporating the results of the trained machine learning model to predict the effect of one or more patterns. Regardless, if the difference between the expected and the desired fill/degas rates are greater than a threshold, the process can trigger a return to step 204 for reevaluation of the region and layer (see 551).

If it is determined at 501 that the pattern is to be implemented using a partial approach the process proceeds to 522 where an object instance skip rate is determined or identified. For example, the object instance skip rate might comprise skipping one object instance every X number of objects instances. Alternatively, a skip rate might comprise skipping multiple object instances Y for every X number of object instances. Additionally, this approach can be combined with a process that accounts for object instances that are skipped due to DRC violations that they would cause. In some embodiments, patterns are placed using the full fill/degas approach but are post processed to remove a corresponding number of object instances specified by the skip rate.

The process starts at 524 where a number of object instances are placed or attempted to be placed. As with the full pattern flow, the object instance failures and/or successes can be captured at 535. In some embodiments, attempts to place (whether those attempts result in actual placements) are used as the determining factor on whether to skip placement locations. In some embodiments, only once the specified number of object/hole instances are placed are any objects/holes skipped.

In some embodiments, once a specified number of objects/holes are placed the process determines whether the number of object(s) to be skipped is already accounted for by the object placement failures (see 525). If the object placement failures do not account for the number(s) to be skipped, then the process proceeds to 526 where an appropriate number of candidate placement locations are skipped. Otherwise, the process loops back to 524 where more instances of objects are placed while there are more objects to be placed (see 527). Once there are no more objects for placement the process proceeds to 550 as discussed above.

Figure 6:
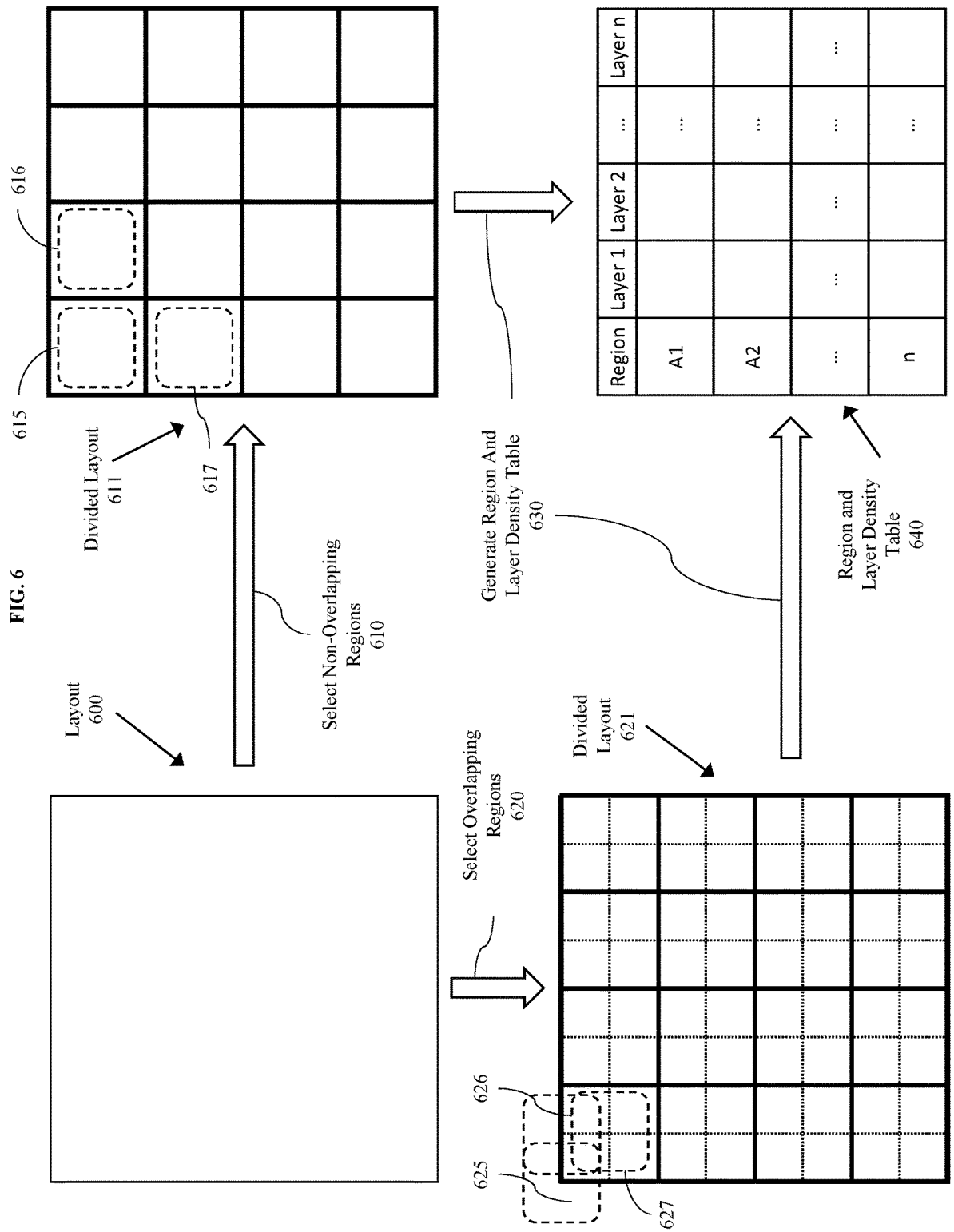
FIG. 6 illustrates an example of different region and traversal definitions and an associated data structure according to some embodiments.

FIG. 6 illustrates an example of different region and traversal definitions and an associated data structure according to some embodiments. Generally, the traversal definitions correspond to non-overlapping or overlapping regions. FIG. 6 illustrates two different approach that could be utilized in the disclosed approach though others are possible.

For example, a layout area 600 might comprise a rectangular or square shape. That shape could be divided into a number of regions. As discussed previously, the size of each region is normally dictated by the process node. Thus, the size of a region can largely be considered fixed. That fixed size can be used to determine the size and location of each regions.

As illustrated, if the process selects (e.g., based on a user input, parameter, or rule) non-overlapping regions (see 610), the layout area might be divided as illustrated at 611. As can be seen in this simplified example, the layout area is divided into a four-by-four array corresponding to 16 regions. Each of those regions can later be considered without overlap (see e.g., region A1 at 615, region A2 at 616, and region B1 at 617.

Similarly, if the process selects (e.g., based on a user input, parameter, or rule) overlapping regions (see 620), the layout area might be divided as illustrated at 621. As can be seen in this simplified example, the layout area is divided into eight-by-eight regions with portions of those regions overlapping with other regions. For example, if 625 corresponds to region A1 and 626 correspond to region A2, and 627 corresponds to region B1, then region A1 includes a portion that overlaps with regions B1 and A2, region A2 includes a portion that overlaps with region A1 and B1, and another portion that overlaps with region A3 and B3. Furthermore, if we continued this model, the region A3 might include a portion that overlaps with region B2 and A2, and another portion that overlaps with region B4 and A4. Of course, other overlapping arrangements are possible. Here the overlap is 50% in the horizontal direction and 50 in the vertical direction.

Regardless, of whether overlapping or non-overlapping regions are selected a data structure (e.g., region and density table 640) might be generated at 630. As illustrated according to the figure this might comprise a table have a row for each region and a column for each layer of a layout.

Figure 7:
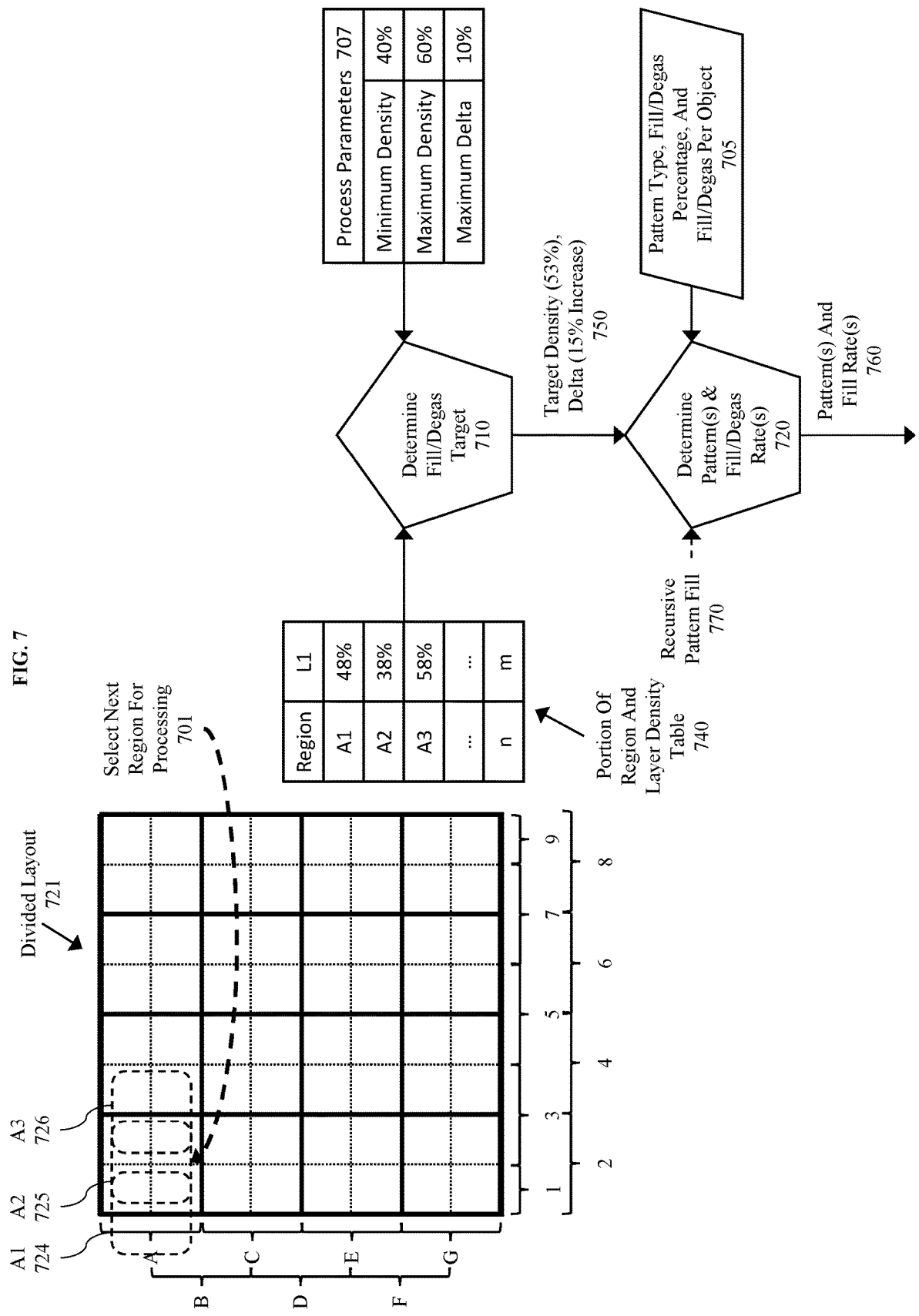
FIG. 7 illustrates an example of a region-based evaluation of a layout in relation to a neighbor region(s) to determine a balancing operation(s) according to some embodiments.

FIG. 7 illustrates an example of a region-based evaluation of a layout in relation to a neighbor region(s) to determine a balancing operation(s) according to some embodiments. The approach illustrated here is but one possible approach and even in this approach different results might be achieved with different process parameters and target selection rules. Thus, FIG. 7 illustrates one approach according to some embodiments.

As illustrated, the example operates on a layout that is divided into a number of overlapping regions. Here, we illustrate yet another possible overlap variation. Whereas the variation illustrated in FIG. 6 shows that a row that encompasses a portion that is within the layout area and a portion that is not (which is ignored) the approach here does not encompass a portion outside of the upper and/or lower layout boundaries. In some embodiment, a layout may be divided and overlapping but additionally or optionally not encompass any portion that is outside of the left and/or right layout boundaries. However, for this example, the first and last columns are part of a region that encompasses a portion outside of the layout area. The layout is divided into different overlapping regions from A1 to G9 (see 721). For Example, A1 comprises an area that encompasses a non-existent portion on the left and a half size (half of a region) portion on the right. A2 encompasses a full-size region in the upper leftmost corner of the divided layout 721, and A3 (726) is shifted half a region to the right of A2.

At 701 the next region is selected for processing. Here the traversal is on a row and column basis, where first a row is selected, and then each column of that row is analyzed before moving to the next row to analyze the next column and so on until the process finishes.

Once a region is selected for processing (see 701) a determination is made as to whether the region (or a portion thereof) should be filled or degassed. This determination is illustrated at 710 and depends on various inputs. First the process parameters 707 provide a lower and upper bound on the density level for the region. Additionally, the process parameters included a maximum density delta between adjacent regions. A portion of the region and layer density table is illustrated at 740. Here for the sake of simplicity we consider only the densities of A1-A3. Alternatively, multiple different regions might be considered at one time to balance the deltas between the respective regions. Of course, if the regions did not overlap this would also simplify processing. Here the process might comprise: determining/identifying the density of the previous and the next regions; determining whether either the first or the next regions density exceed the minimum or the maximum density, selecting the minimum density as the lower bound if the minimum density is violated by one of the regions, selecting the maximum density as the upper bound if the maximum density is violated by one of the regions, selecting the lowest region density of the previous and next regions as the lower bound if the minimum density is not violated, selecting the highest region density of the previous and next regions as the higher bound if the maximum density is not violated, selecting the average of the selected lower and high bounds as the target fill rate, and determining a delta between the current density of the selected region (A2) to determine whether the density should be increase by fill operations or decreased by degas operations and the amount thereof. This information might be output at 750. For example, neither A1 nor A3 violate the minimum or maximum density values, thus the lower of the two is selected as the lower bound, and the higher of the two is selected as the upper bound. Here a delta of 10% is the highest that is allowed. Thus, the 20% different between the minimum and maximum density if split down the middle would not violate the maximum density delta with regard to region A2. Thus, the average between the two layers (A1 and A3) can be used to specify the target density (53%) and the delta can be determined by comparing that to the current fill rate for the selected layer (A2) which is a 15% increase which corresponds to fill operations.

After the delta is determined, the pattern(s) and fill rates can be determined. For example, a pattern having a 50% fill rate might be selected for use where after each placement of an instance of an object within the pattern two candidate placement locations are skipped. This might be determined based on the information at 705 (e.g., by selecting the pattern of the correct type with the largest percentage first even if the ideal effects of the pattern exceed the target). In some embodiments, the previously discussed machine learning models might be used to estimate the likely actual successful placement rates, which might then be used to determine the fill rate and whether any additional patterns should be used (see 760). In some embodiments, after each pattern is selected an attempt is made to fill the relevant area with the object instances being placed and tracked to determine the actual effect of those placements using a recursive process to place, calculate, and determine any difference between the target density and the actual density (see 770).

FIGS. 8A-8E illustrate an example fill pattern placement flow using multiple patterns according to some embodiments. This illustration covers only some embodiments of those disclosed herein.

Figure 8A:
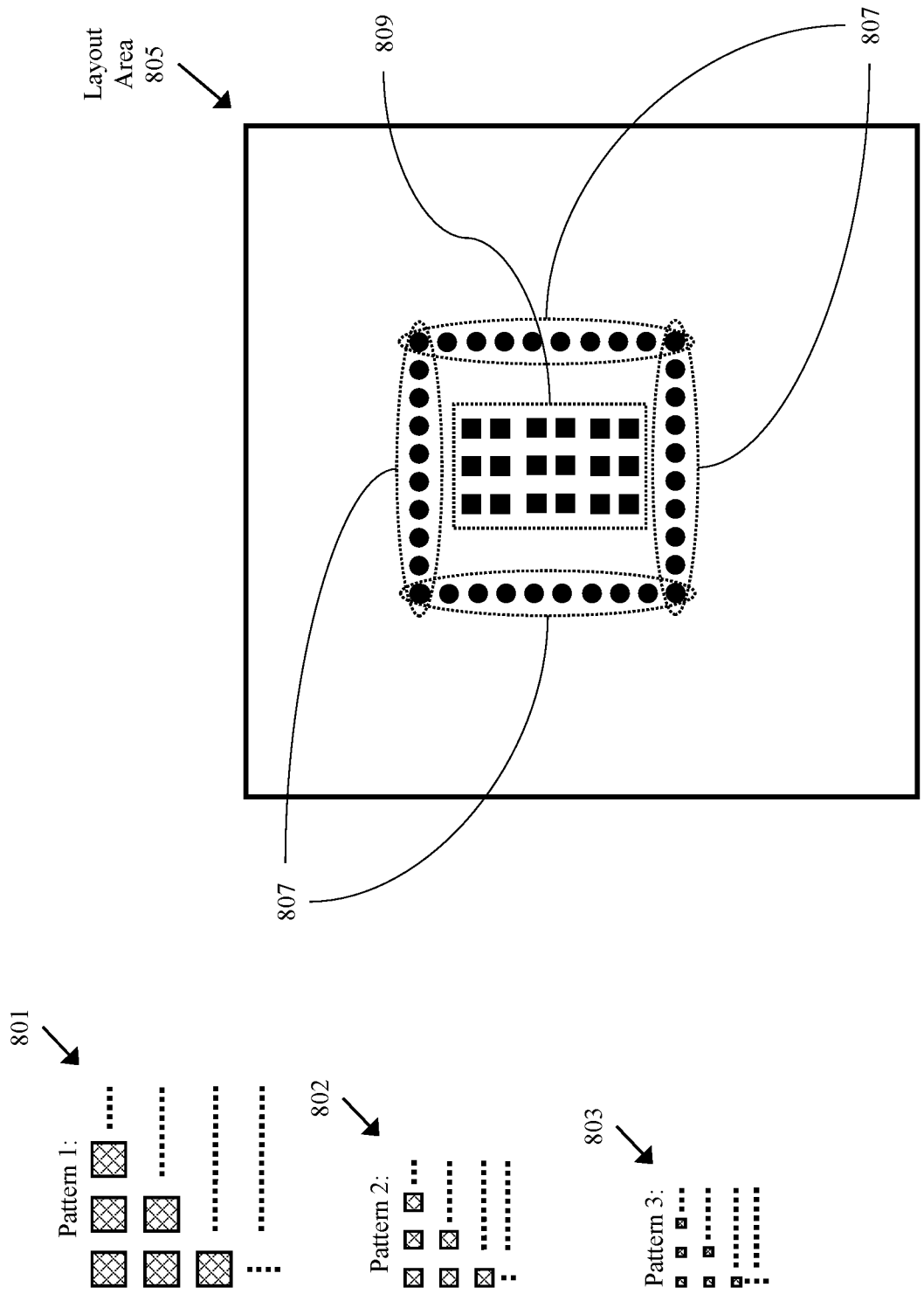
FIGS. 8A-8E illustrate an example fill pattern placement flow using multiple patterns according to some embodiments.

FIG. 8A includes an illustration of three fill patterns on one layout area. The layout area 805 includes round objects arranged along a perimeter of an imaginary square (see solid round circles 807 in layout area 805). Additionally, surrounded by those objects is a group of rectangular contacts (see solid rectangles 809 in layout area 805). While not illustrated here, these elements might correspond or connect to different traces and vias. However, this example is simplified to ease illustration, and thus does not include any such traces.

The three patterns comprise different sized shapes having a minimum spacing as specified in the process node parameters. Pattern 1 (see 801) includes the largest objects. Because the spacing between objects in patterns 1-3 (see 801, 802, and 803) is the same, the larger the object the greater the amount of fill the pattern would cause under ideal conditions, pattern 2 (see 802) has smaller objects then pattern 1, but larger than pattern 3 which has still smaller objects and thus a lower fill rate.

Figure 8B:
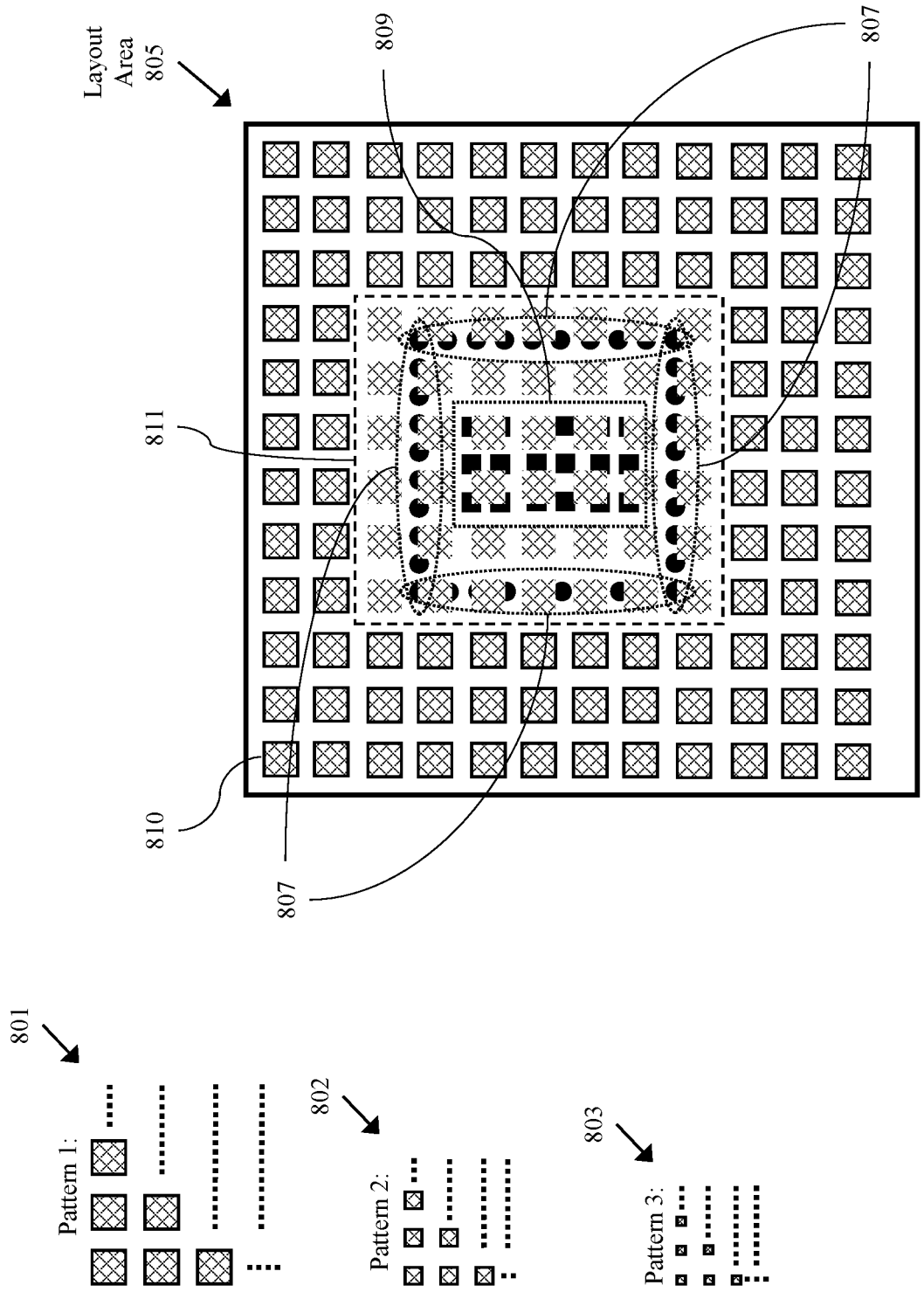
Figure 8C:
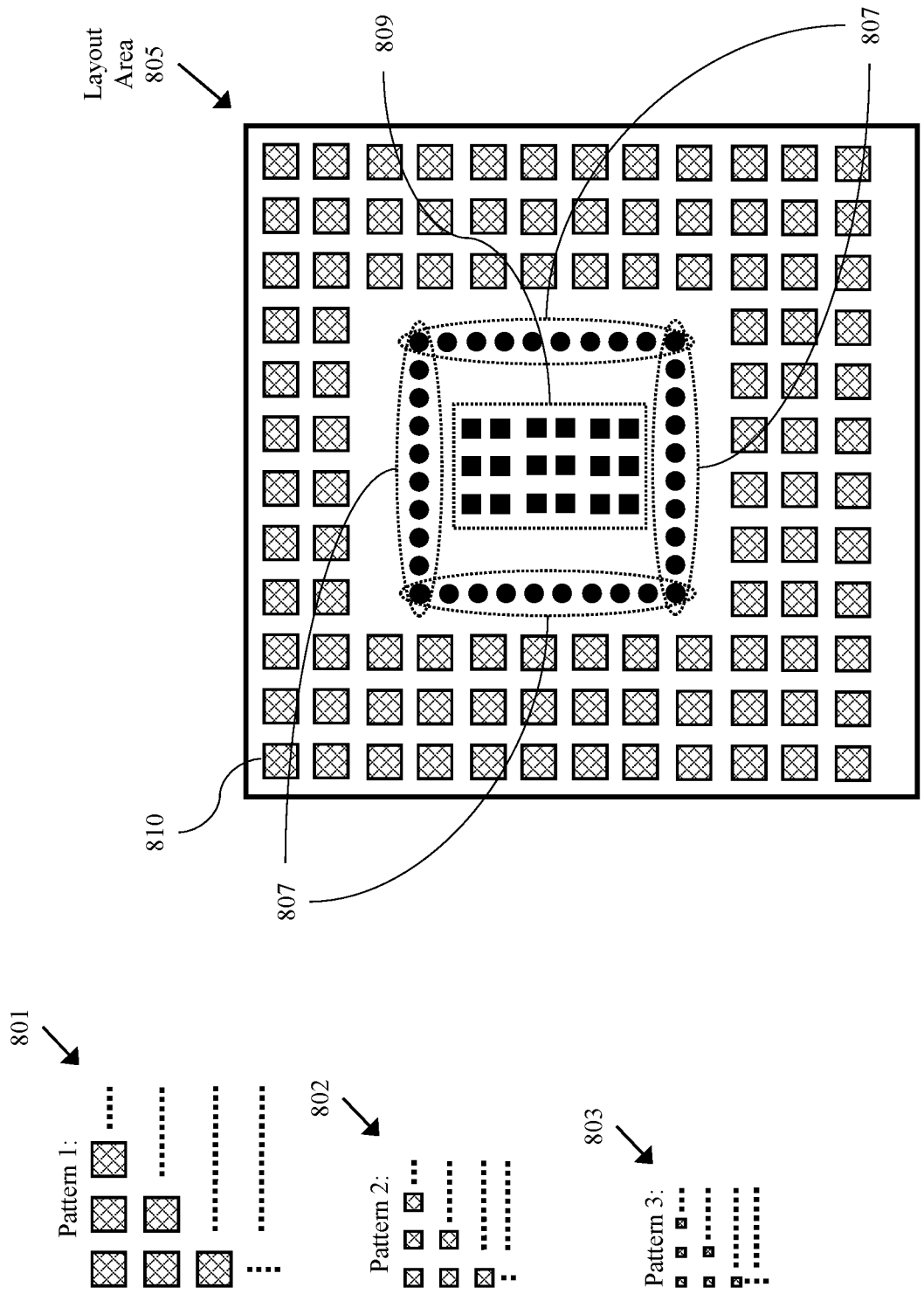

FIG. 8B illustrates a full fill rate of pattern 1 on the layout area 805. As can be seen the layout area now includes multiple instances of the objects of pattern 1 (see e.g., 810). However, where the objects of pattern 1 overlap with or are too close to the any other existing objects (see 807 and 809) those objects cannot be created/used because they would violate design rules and likely result in an inoperable integrated circuit (see objects bound by 811). Thus, FIG. 8C illustrates the layout area after pattern 1 has been applied but without any violating object instances.

Figure 8D:
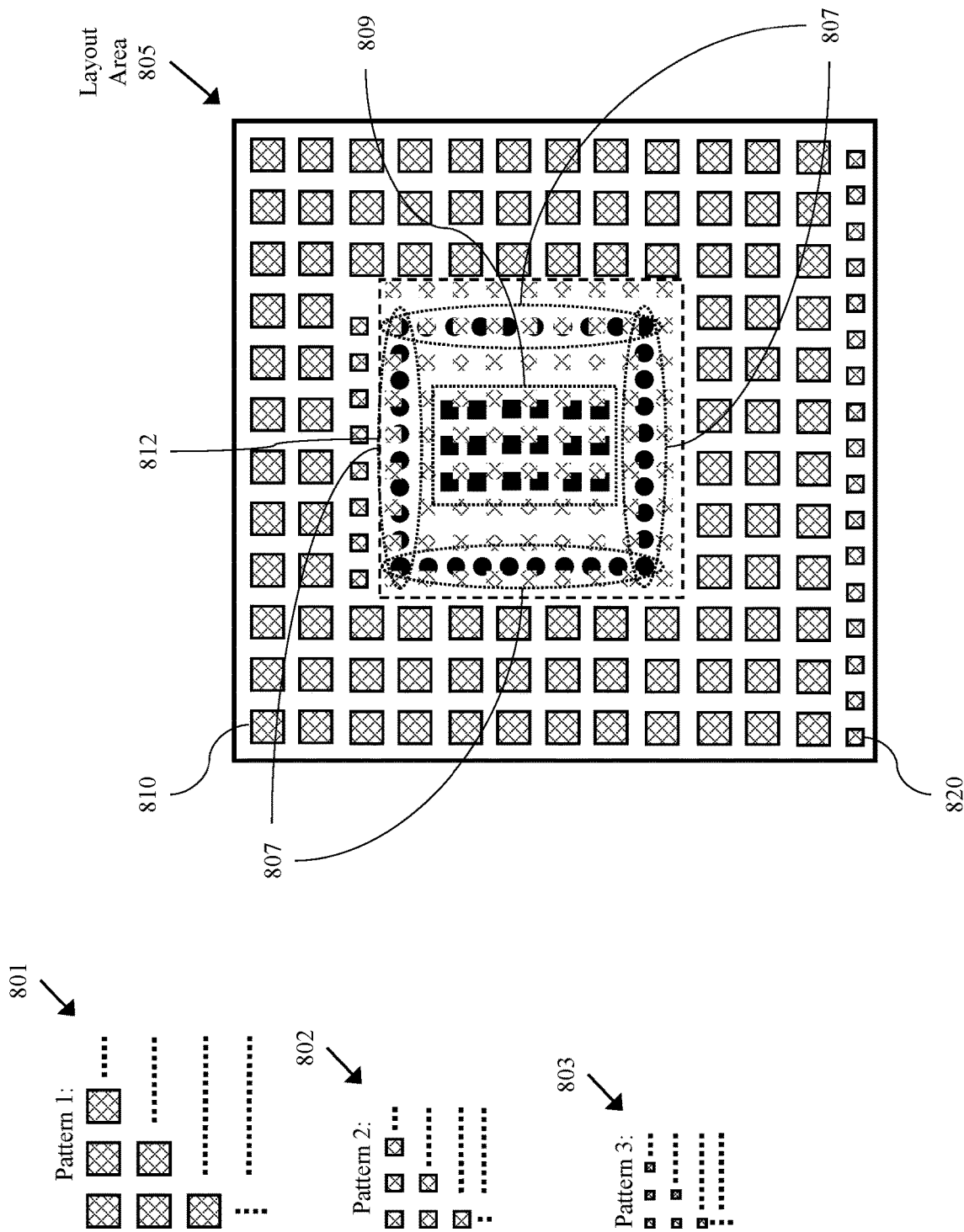

FIG. 8D illustrates a full fill rate of pattern 1 on the layout area. For the sake of this example, we illustrate pattern 2 only in areas that are not already fully populated by object instances for pattern 1. However, in some embodiments, the objects of pattern 1 can be combined with the objects of pattern 2 or any other fill pattern and could be placed without regard to any distance between other fill object instances. For example, this might be accomplished by generating a net called fill. Then, because all fill is connected only to other fill, those object instances could be placed closer to each other or even in contact with or overlapping each other because they belong to the same net. However, any overlap would be accounted for in determining the effect of such fill to calculate the change in the density using the actual area newly covered by an overlapping object, but not the overlapping portion.

As can be seen here, at least some of the objects of pattern 2 (see e.g., 820) are too close to or overlap with the existing objects 807 and 809 (see 812). Thus, these objects cannot be placed. However, as can be seen some objects can be successfully placed above the round objects 807 and along the lower edge of the layout area.

Figure 8E:
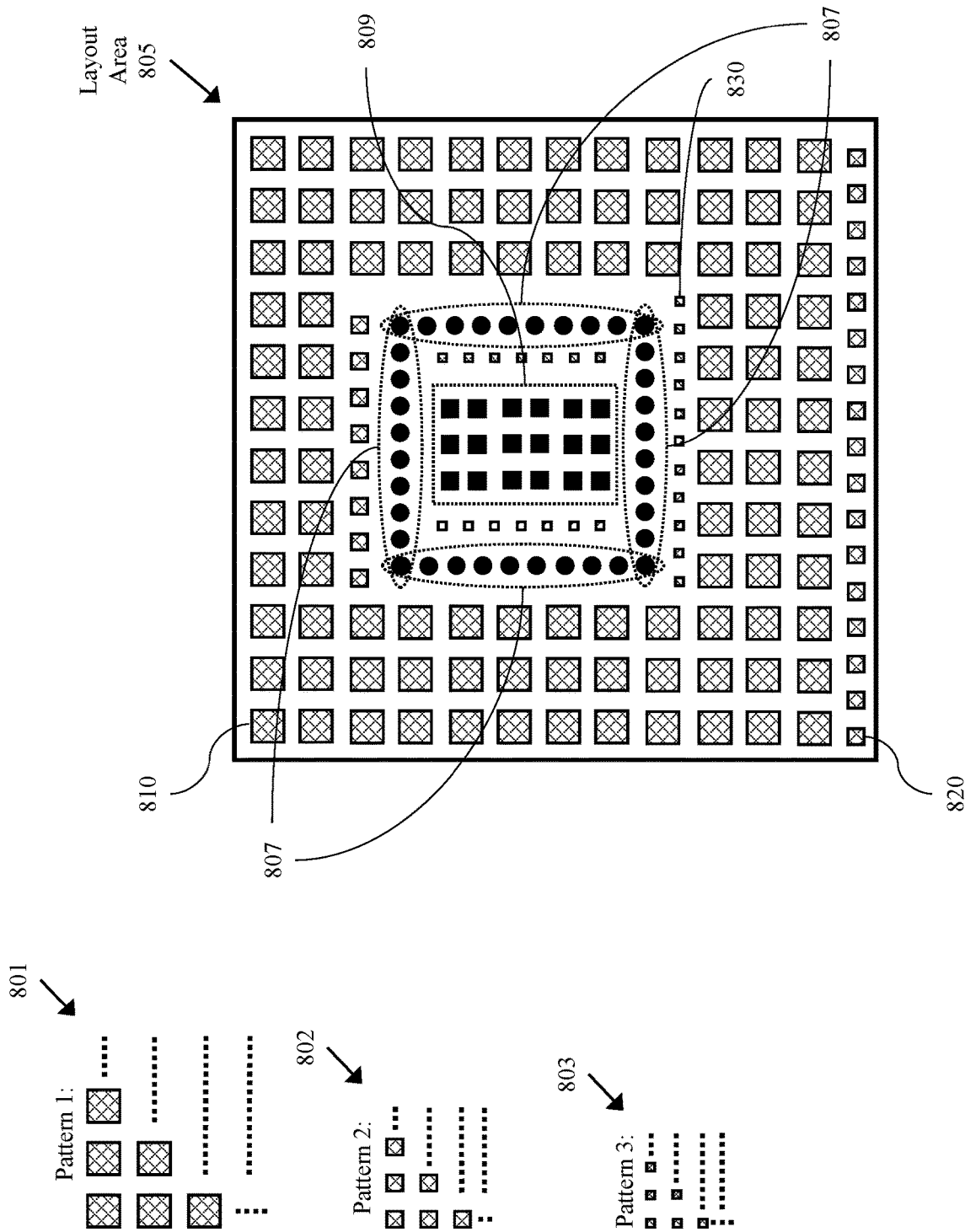

Finally, FIG. 8E illustrates valid placement locations of object instances from pattern 3 (see e.g., 830). As can be seen, the objects of pattern 3 being smaller than those of patterns 1 and 2 can be placed in locations that objects from those other patterns could not.

Figure 9:
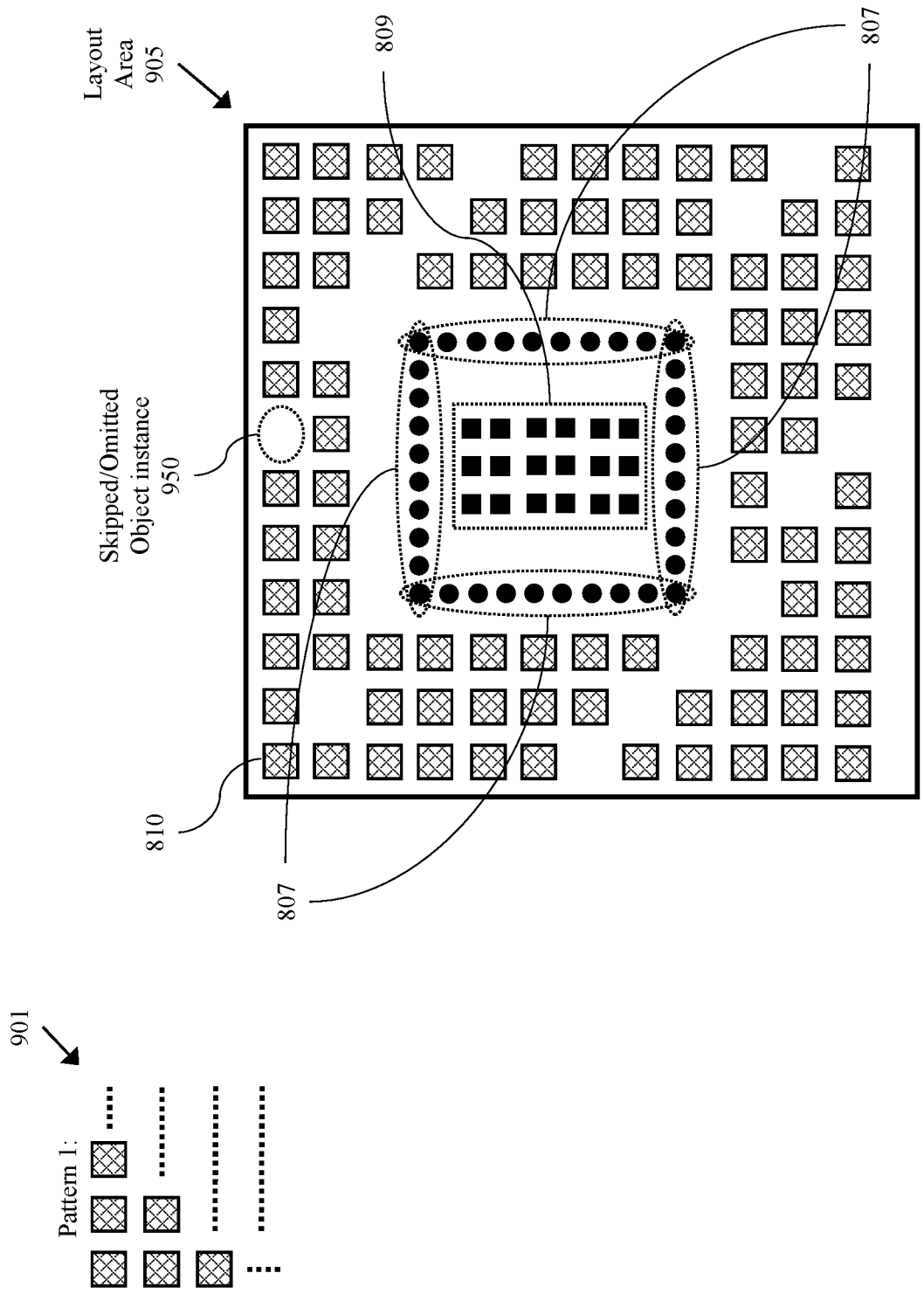
FIG. 9 illustrates an example partial placement pattern according to some embodiments.

FIG. 9 illustrates an example partial placement pattern according to some embodiments. This example is only one such approach that could be used for partial fill of a pattern (e.g., pattern 1, see also object instance of pattern 1 identified as 810).

The approach might comprise skipping some number of objects after a number of successfully placements (See e.g., 950). This distributes the locations in which no object might be placed. For instance, the example here ignores the failed placements caused by 807 and 809 (see description of FIG. 8A-8E) and removes/omits every $7^{th}$ object instance. This could be accomplished in a process that keeps track of object instance placements as they are made, or in a post process that goes back and removes objects at corresponding locations.

Figure 10:
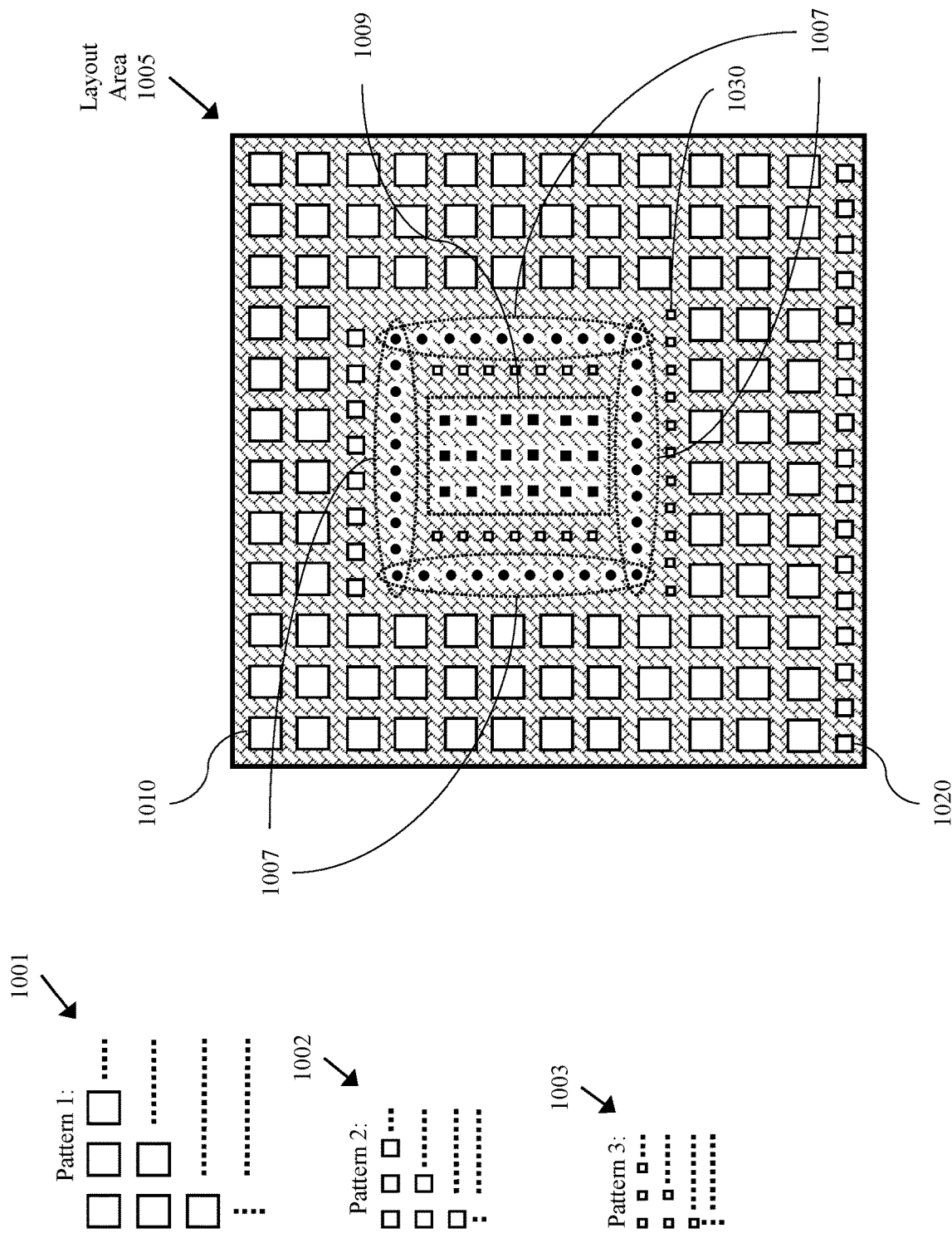
FIG. 10 illustrates an example degas pattern placement using multiple patterns according to some embodiments.

FIG. 10 illustrates an example degas pattern placement using multiple patterns according to some embodiments. Herein the degas patterns are essentially a mirror of the fill patterns, though other patterns could be utilized.

Specifically, patterns 1-3 (see 1001, 1002, and 1003) comprise holes to be placed at corresponding locations in the layout area 1005 which represent the same layout area 805 but with a metal fill element. These holes are generally applicable where a layer includes a planer fill and where holes can then be placed to degas/decrease the overall amount of area covered within a layer. This process is largely the same as that discussed in regard to FIGS. 8A-8E and 9 and will therefore only be illustrated briefly here. However, there are some notable differences. First, the objects 1007 and 1009 are largely equivalent to 807 and 809 but as illustrated are illustrated as including a keep out region for the planar element of the layer. Additionally, instead of placing fill, each object instance places a hole that removes the metal fill from that area (see e.g., 1010 for pattern 1, 1020 for pattern 2, and 103 for pattern 3.

System Architecture Overview

Figure 11:
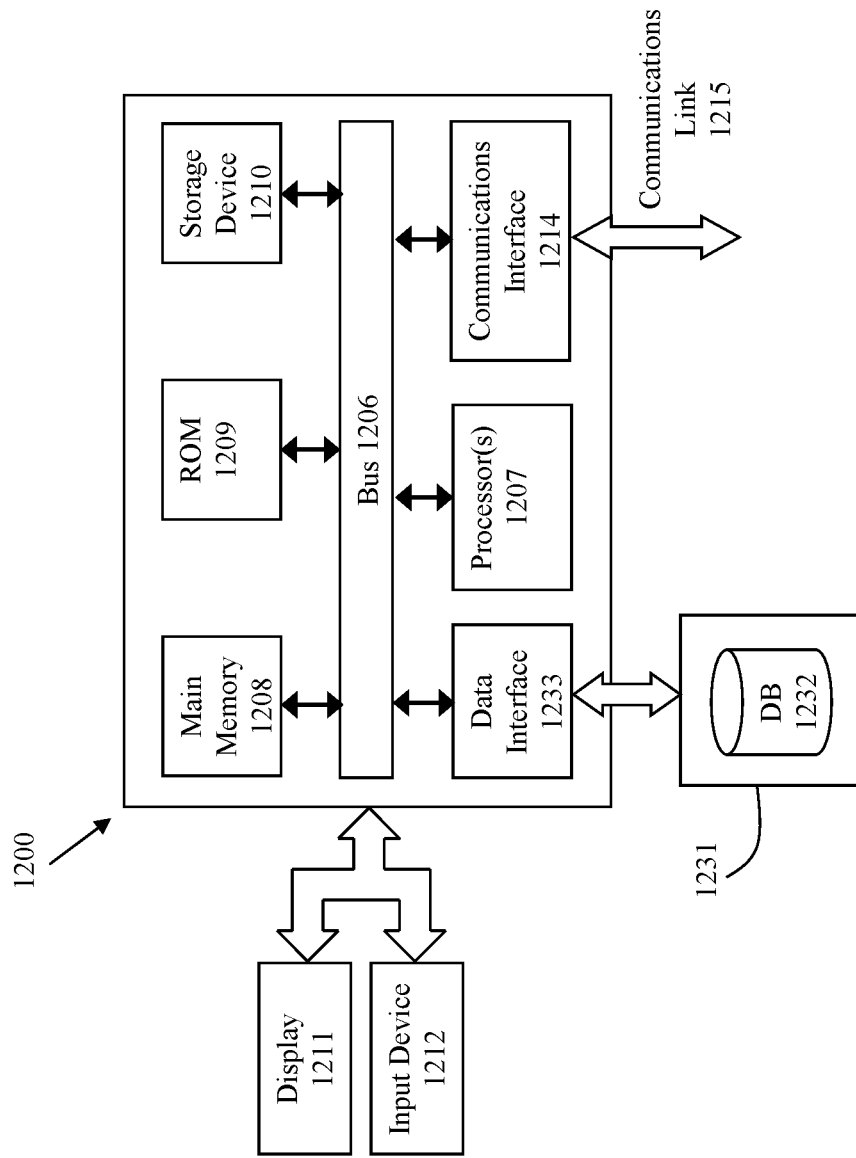
FIG. 11 shows an architecture of an example computing system with which the invention or parts of the invention may be implemented.

FIG. 11 shows an architecture of an example computing system with which the invention may be implemented. Computer system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control.

According to one embodiment of the invention, computer system 1200 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1200. According to other embodiments of the invention, two or more computer systems 1200 coupled by communication link 1215 (e.g., LAN, PTSN, or wireless network) may perform the sequence of instructions required to practice the invention in coordination with one another.

Computer system 1200 may transmit and receive messages, data, and instructions, including program, e.g., application code, through communication link 1215 and communication interface 1214. Received program code may be executed by processor 1207 as it is received, and/or stored in disk drive 1210, or other non-volatile storage for later execution. Computer system 1200 may communicate through a data interface 1233 to a database 1232 on an external storage device 1231.

Therefore, what has been described herein an improvement to EDA tools used to design semiconductor devices that improves the processes and results of those processes for balancing integrated circuits. The approaches disclosed herein improves the reproducibility, reliability, and results of balancing operations by formalizing an approach according to the embodiments disclosed.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
identifying an integrated circuit and a balancing parameter, wherein the integrated circuit has multiple regions;
scanning at least two of the multiple regions of the integrated circuit;
evaluating the at least two of the multiple regions to determine whether a balancing operation on a region comprises a fill operation or a degas operation; and
performing the balancing operation on the region.

2. The method of claim 1, wherein the integrated circuit is divided into non-overlapping regions.

3. The method of claim 1, wherein the integrated circuit is divided into overlapping regions.

4. The method of claim 1, wherein the balancing parameter comprises a minimum density, a maximum density, a maximum density delta, and a region size.

5. The method of claim 1, wherein evaluating at least two of the multiple regions to determine a balancing operation comprises determining a target density based on the balancing parameter and one or more rules.

6. The method of claim 1, wherein evaluating at least two of the multiple regions to determine a balancing operation further comprises a determining whether a pattern should be partially applied.

7. The method of claim 1, wherein evaluating at least two of the multiple regions to determine a balancing operation is further based on at least a comparison of a density of a layer in the region and the same layer in another region.

8. The method of claim 1, wherein the balancing operation comprises placing one or more object instances based on a pattern.

9. A non-transitory computer readable medium having stored thereon a sequence of instructions which, when executed by a processor performs a set of acts, the set of acts comprising:
- identifying an integrated circuit and a balancing parameter, wherein the integrated circuit has multiple regions;
- scanning at least two of the multiple regions of the integrated circuit;
- evaluating the at least two of the multiple regions to determine whether a balancing operation on a region comprises a fill operation or a degas operation; and
- performing the balancing operation on the region.

10. The computer readable medium of claim 9, wherein the integrated circuit is divided into non-overlapping regions.

11. The computer readable medium of claim 9, wherein the integrated circuit is divided into overlapping regions.

12. The computer readable medium of claim 9, wherein the balancing parameter comprises a minimum density, a maximum density, a maximum density delta, and a region size.

13. The computer readable medium of claim 9, wherein evaluating at least two of the multiple regions to determine a balancing operation comprises determining a target density based on the balancing parameter and one or more rules.

14. The computer readable medium of claim 9, wherein evaluating at least two of the multiple regions to determine a balancing operation further comprises a determining whether a pattern should be partially applied.

15. The computer readable medium of claim 9, wherein evaluating at least two of the multiple regions to determine a balancing operation is further based on at least a comparison of a density of a layer in the region and the same layer in another region.

16. The computer readable medium of claim 9, wherein the balancing operation comprises placing one or more object instances based on a pattern.

17. A computing system, comprising:
- memory having a set of instructions; and
- a processor that executes the set of instructions to perform a set of acts, the set of acts comprising:
  - identifying an integrated circuit and a balancing parameter, wherein the integrated circuit has multiple regions;
  - scanning at least two of the multiple regions of the integrated circuit;
  - evaluating the at least two of the multiple regions to determine whether a balancing operation on a region comprises a fill operation or a degas operation; and
  - performing the balancing operation on the region.

18. The computing system of claim 17, wherein the integrated circuit is divided into non-overlapping regions.

19. The computing system of claim 17, wherein the integrated circuit is divided into overlapping regions.

20. The computing system of claim 17, wherein the balancing parameter comprises a minimum density, a maximum density, a maximum density delta, and a region size.

* * * * *